United States Patent
Bunda

(10) Patent No.: US 12,385,596 B2
(45) Date of Patent: Aug. 12, 2025

(54) PUMP SUPPORT DEVICE

(71) Applicant: Douglas Michael Bunda, Corunna (CA)

(72) Inventor: Douglas Michael Bunda, Corunna (CA)

( * ) Notice: Subject to any disclaimer, the term of this patent is extended or adjusted under 35 U.S.C. 154(b) by 336 days.

(21) Appl. No.: 18/187,725

(22) Filed: Mar. 22, 2023

(65) Prior Publication Data

US 2024/0318767 A1 Sep. 26, 2024

(51) Int. Cl.
| | |
|---|---|
| *F16M 11/08* | (2006.01) |
| *F04B 53/04* | (2006.01) |
| *F04B 53/22* | (2006.01) |

(52) U.S. Cl.
CPC ............ *F16M 11/08* (2013.01); *F04B 53/04* (2013.01); *F04B 53/22* (2013.01); *F05D 2260/02* (2013.01); *F05D 2300/10* (2013.01)

(58) Field of Classification Search
CPC ..................................................... F16M 11/08
USPC ................... 248/131; 269/55, 56, 57, 58, 71
See application file for complete search history.

(56) References Cited

U.S. PATENT DOCUMENTS

| | | | | | |
|---|---|---|---|---|---|
| 2,771,821 A * | 11/1956 | Beusch | ............. | B23Q 1/525 |
| | | | | | 33/537 |
| 3,089,478 A * | 5/1963 | Jones | ............. | B28D 7/043 |
| | | | | | 125/35 |
| 4,140,306 A * | 2/1979 | Wheeler | ............. | B25H 1/0007 |
| | | | | | 269/69 |
| 4,418,901 A * | 12/1983 | Woods | ............. | B25B 1/22 |
| | | | | | 269/251 |
| 4,907,778 A * | 3/1990 | Rockwell | ............. | B25H 3/006 |
| | | | | | 248/676 |
| 5,358,227 A * | 10/1994 | Bennett | ............. | B23Q 1/48 |
| | | | | | 269/68 |
| 6,244,553 B1 * | 6/2001 | Wang | ............. | F16M 11/2021 |
| | | | | | 379/454 |
| 6,481,686 B1 * | 11/2002 | Jan | ............. | F16M 11/2057 |
| | | | | | 248/349.1 |
| 8,276,867 B2 * | 10/2012 | Hung | ............. | F16M 11/2078 |
| | | | | | 248/323 |
| 8,720,878 B2 * | 5/2014 | Lin | ............. | B23Q 1/25 |
| | | | | | 269/289 R |

* cited by examiner

Primary Examiner — Jason L Vaughan
(74) Attorney, Agent, or Firm — Orin Del Vecchio

(57) ABSTRACT

A pump support device that is configured to provide support for a centrifugal pump during service so as to facilitate desired orientation and positioning thereof. The present invention includes a base member that is planar in manner having an upper surface and a lower surface. The upper surface of the base member includes a first vertical support member assembly comprised of a plurality of configurable support members. A rotational member is operably coupled to the lower surface of the base member and is configured to provide rotation thereof three-hundred and sixty degrees. A second vertical support member is present on the upper surface and is intermediate the first lateral member and second lateral member of the lateral support assembly. An oil drain member is secured to the upper surface and is operable to direct oil to a container secured to the second end thereof.

8 Claims, 3 Drawing Sheets

PUMP SUPPORT DEVICE

FIELD OF THE INVENTION

The present invention relates generally to maintenance equipment, more specifically but not by way of limitation, a device configured to provide support and access to industrial pumps and other equipment wherein the device facilitates improved access and handling during maintenance and service procedures.

BACKGROUND

Industrial equipment must be consistently maintained and serviced in order to ensure proper operation of the equipment. Industrial mechanics and service technicians work on a plurality of different types of equipment. One example of a common type of industrial equipment is a centrifugal pump. These large pumps are employed in a variety of applications that include but are not limited to water management and oilfield. These pumps vary in size but most are quite large and can weigh hundreds of pounds.

During maintenance and service of centrifugal pumps, the pumps are removed from service and transported to an industrial shop for rebuilding or other required maintenance. The pumps are typically placed on a workbench and it is common for attempts to be made to position and manipulate the pump with conventional wood blocks or other similar types of material. This conventional method has proven ineffective as access to the pumps and handling thereof does not provide ideal access to the pump as needed.

Accordingly, there is a need for a pump support device to which a pump can be releasably secured wherein the device facilitates access and position manipulation of the pump during service thereof.

SUMMARY OF THE INVENTION

It is the object of the present invention to provide a pump support device to which a pump is releasably secured to perform service on the pump wherein the present invention includes a base member.

Another object of the present invention is to provide a support device for a pump employed during service of the pump wherein the base member is planar in manner and includes an upper surface and a lower surface.

A further object of the present invention is to provide a pump support device to which a pump is releasably secured to perform service on the pump wherein the present invention includes a rotation member wherein the rotation member is secured to the lower surface of the base member.

Yet a further object of the present invention is to provide a support device for a pump employed during service of the pump wherein the present invention includes a first vertical support member assembly.

Still another object of the present invention is to provide a pump support device to which a pump is releasably secured to perform service on the pump wherein the first vertical support member assembly is comprised of support members that are configured to be arrangeable.

An additional object of the present invention is to provide a support device for a pump employed during service of the pump wherein the base member further includes secured to the upper surface thereof a second vertical support member.

Yet a further object of the present invention is to provide a pump support device to which a pump is releasably secured to perform service on the pump wherein the base member includes lateral support assembly secured to the upper surface of the base member.

Still another object of the present invention is to provide a support device for a pump employed during service of the pump wherein the upper surface of the base member includes a first fastener and a second fastener proximate the first end of the base member at opposing corners thereof.

Yet an additional object of the present invention is to provide a pump support device to which a pump is releasably secured to perform service on the pump wherein the present invention further includes an oil drain member secured to the upper surface of the base member.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
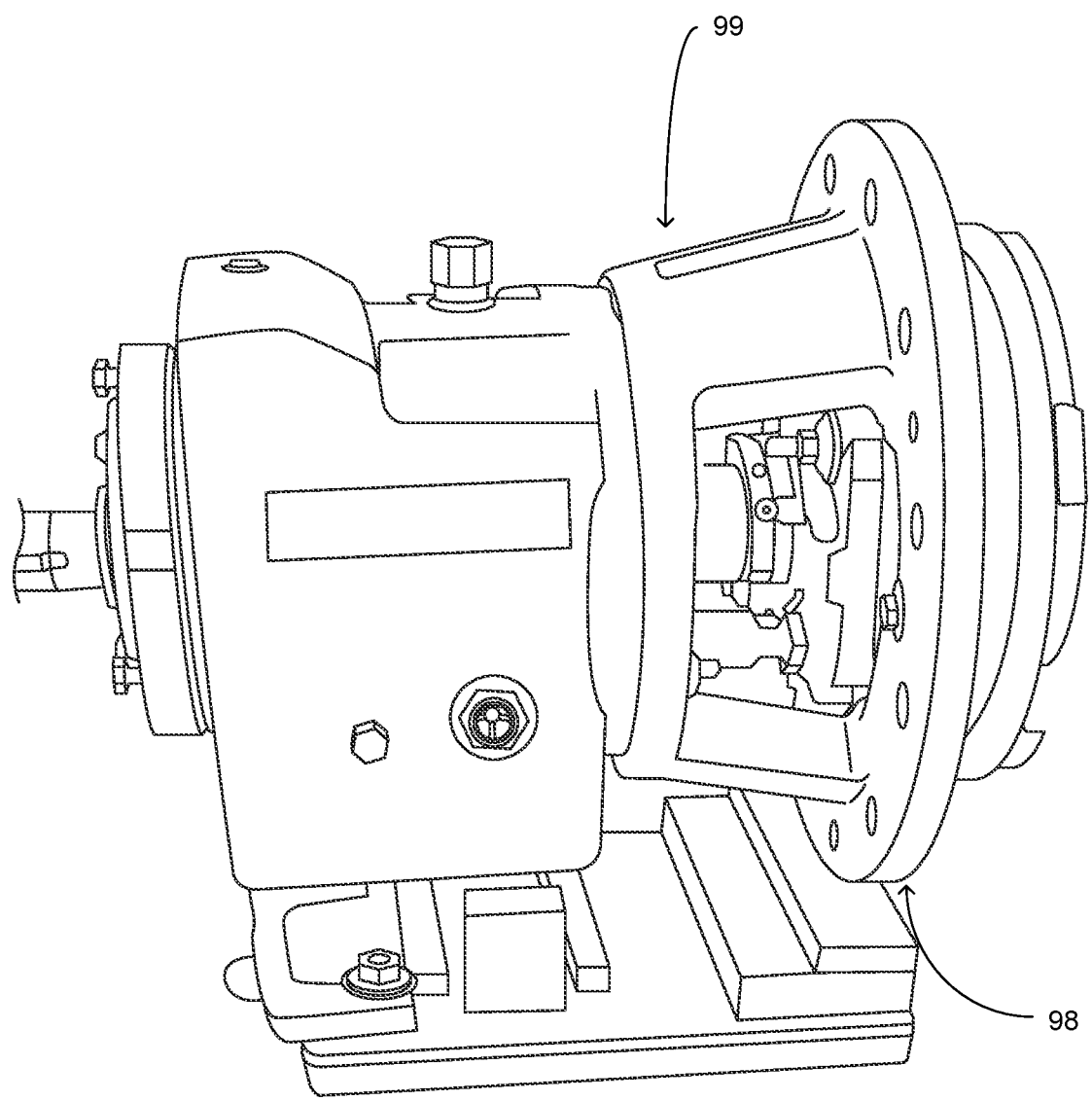
FIG. 1 is a perspective view of the present invention with an exemplary pump secured thereto.
Figure 2:
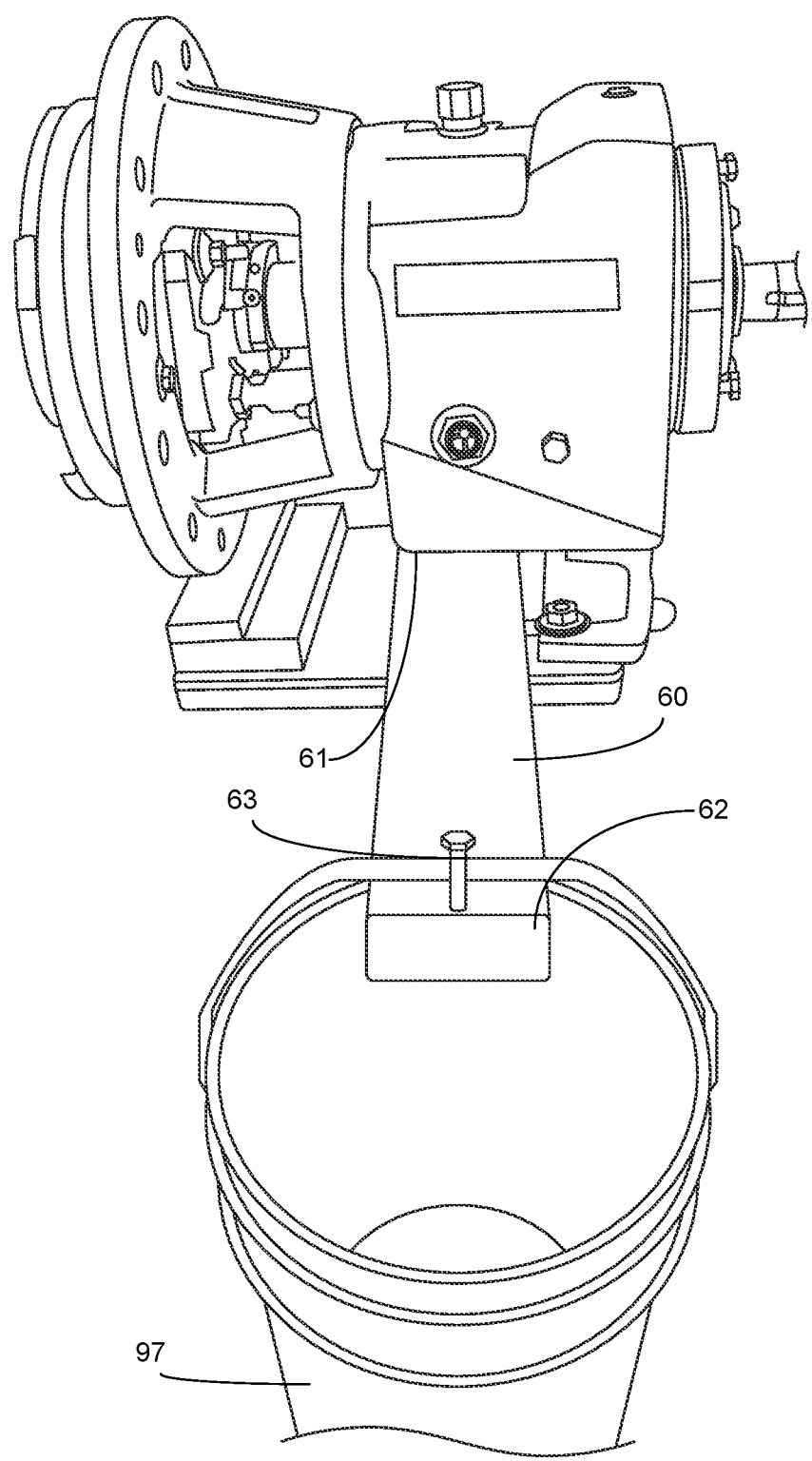
FIG. 2 is a perspective view of the present invention having the oil drain member installed.
Figure 3:
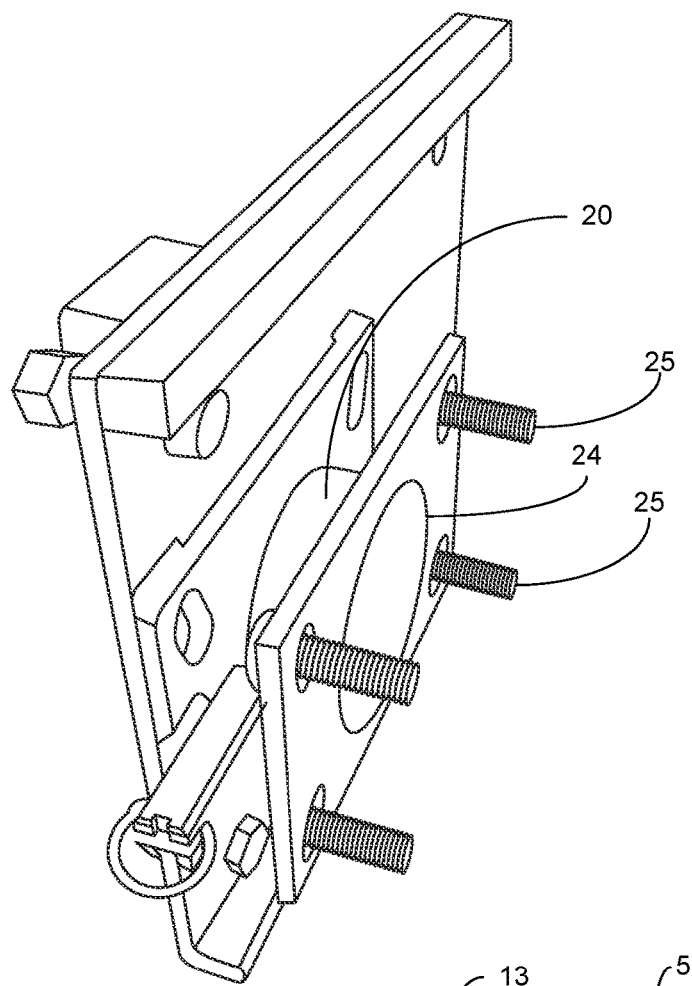
FIG. 3 is a bottom view of the present invention.
Figure 4:
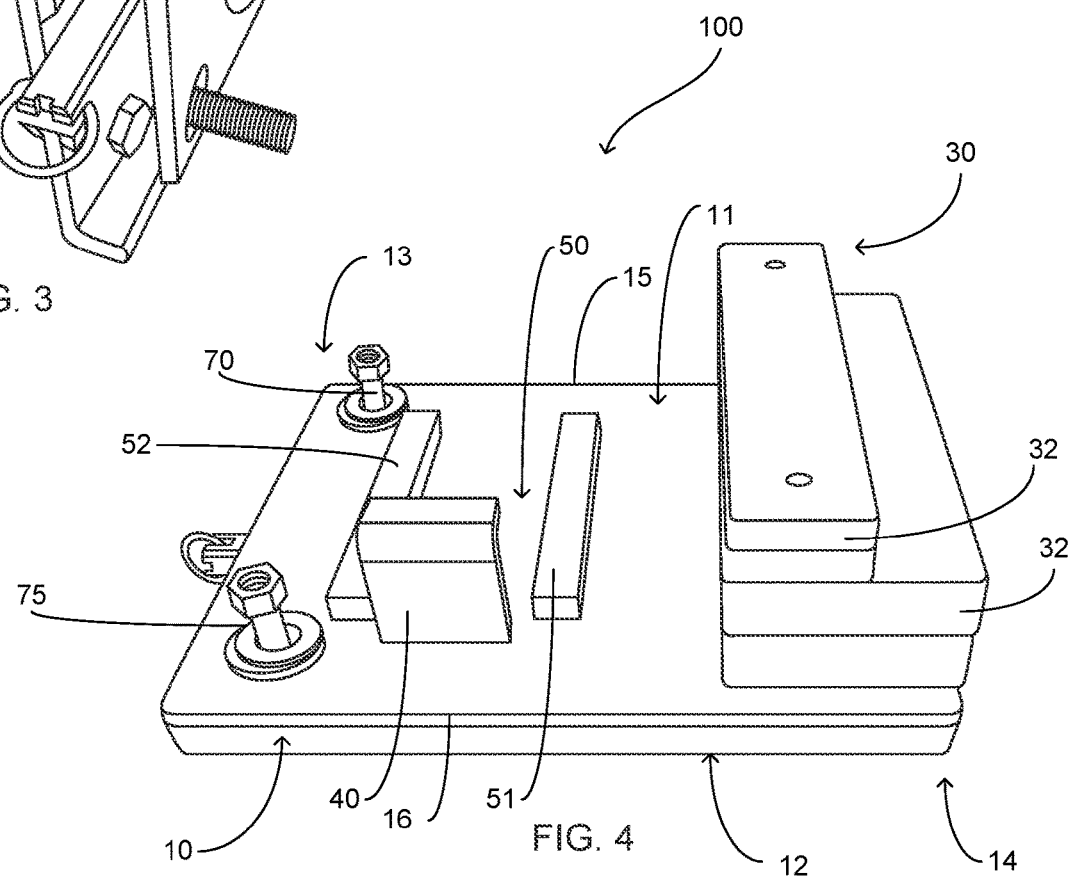
FIG. 4 is a top perspective view of the present invention.

Referring now to the drawings submitted herewith, wherein various elements depicted therein are not necessarily drawn to scale and wherein through the views and figures like elements are referenced with identical reference numerals, there is illustrated a pump support device 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted herewith, the pump support device 100 is manufactured from a durable material such as but not limited to metal. It should be understood that the elements of the pump support device 100 discussed herein could be provided in alternate shapes and sizes. The pump support device 100 includes a base member 10. The base member 10 is planar in manner having an upper surface 11 and a lower surface 12. The base member 10 includes a first end 13, second end 14 and further includes a first lateral edge 15 and second lateral edge 16. While the base member 10 is illustrated herein as being rectangular in shape, it is contemplated within the scope of the present invention that the base member 10 could be provided in alternate shapes, sizes and of varying thickness.

A rotation member 20 is operably coupled to the lower surface 12 of the base member 10. Rotation member 20 is configured to provide three-hundred-and-sixty-degree rotation of the base member 10. The rotation member is locked into position with pin 22. It should be understood within the scope of the present invention that the rotation member 20 could be locked into various increments of rotation such as but not limited to ninety degrees. The rotation member 20 is mounted to a workbench or other suitable surface utilizing plate member 24 and bolts 25. It should be understood within the scope of the present invention that the rotation member 20 could be operably coupled to a support surface employing alternate elements in addition to or in conjunction with the elements discussed herein.

Superposed the upper surface 11 of the base member 10 proximate the second end 14 is the first vertical support assembly 30. The first vertical support assembly 30 is comprised of a plurality of support members 32 that are releasably secured to each other. The support members 32 are releasably secured to each other utilizing suitable durable techniques. The support members 32 in a preferred embodiment are rectangular in shape and extend intermediate the first lateral edge 15 and second lateral edge 16. The support members 32 are configurable in alternate arrangements so as to support exemplary pump 99. Dependent upon pump size and type the support members 32 are arranged so as to engage the end 98 of the pump 99 in order to provide a desirable level orientation of the pump 99 while coupled to the pump support device 100. It should be understood within the scope of the present invention that the pump support device 100 could be provided with alternate quantiles of support members 32 in order to provide the desired functionality as discussed herein for different models of pumps 99.

A second vertical support member 40 is operably coupled to the upper surface 11 of the base member 10. The second vertical support member 40 is secured to the upper surface 11 employing suitable durable techniques. The second vertical support member 40 is perpendicular to the upper surface 11 extending upward therefrom and is operable to provide support for pump 99. A lateral support assembly 50 is secured to the upper surface 11 proximate the second vertical support member 40 utilizing suitable durable techniques. The lateral support assembly 50 includes a first lateral member 51 and second lateral member 52 that are equivalent in size and parallel in orientation having a space therebetween. The lateral support assembly 50 is proximate the second vertical support member 40 and is oriented perpendicularly with respect to the first lateral edge 15 and second lateral edge 16. The lateral support assembly 50 is configured to engage a portion of a bottom of a pump 99 in order to provide support and stabilization thereof.

Operably coupled to base member 10 extending outward therefrom is the oil drain member 60. Oil drain member 60 is hollow in manner having an opening along the top thereof forming a trough-like structure. The oil drain member 60 includes a first end that 61 that is underneath pump 99 and a second end 62 that extends outward beyond a support surface to which the pump support device 100 is operably coupled. The oil drain member 60 captures oil being drained from a pump 99 and transfers to bucket 97 as the oil drain member 60 has a slight downward angle thereto. Keeper 63 is located at second end 62 of the oil drain member 60 and is configured to operably engage a handle of the bucket 97 so as to maintain the position thereof as oil is being transferred into the bucket 97.

A first fastener 70 and second fastener 75 are secured to the upper surface 11 of the base member 10 proximate the first end 13 thereof. First fastener 70 and second fastener 75 are movably coupled to the base member 10 utilizing threads and are operable to move in an upwards-downwards direction. The first fastener 70 and second fastener 75 are configured to be secured to pump 99 as is illustrated herein in FIG. 1 so as to secure the pump 99 onto the pump support device 100 inhibiting movement thereof. It is contemplated within the scope of the present invention that the pump support device 100 could employ alternate techniques and/or elements to achieve the discussed functionality of the first fastener 70 and second fastener 75.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. A pump support device that is configured to have a pump releasably secured thereto in order to perform maintenance on the pump wherein the pump support device comprises:

a base member, said base member being planar in manner, said base member having a first end and a second end, said base member having a first lateral edge and a second lateral edge, said base member having an upper surface and a lower surface, said base member being manufactured from metal, said base member being rectangular in shape;

a rotation member, said rotation member being operably coupled to said lower surface of said base member, said rotation member configured to provide rotation of said base member three-hundred and sixty degrees, said rotation member being operably coupled to a plate member wherein said plate member is coupled to a support surface;

a first vertical support assembly, said first vertical support assembly being releasably secured to said upper surface of said base member proximate said second end thereof, said first vertical support assembly being comprised of a plurality of support members, said support members being releasably secured and arranged in a vertical stacked orientation; and a first fastener and a second fastener, said first fastener and said second fastener being secured to said base member proximate said first end at opposing corners thereof, said first fastener and said second fastener being movable in an upwards-downwards direction, said first fastener and said second fastener configured to secure to a portion of said pump and inhibit movement thereof.

2. The pump support device configured to have a pump releasably secured thereto in order to perform maintenance on the pump as recited in claim 1, further including a lateral support assembly, said lateral support assembly comprising a first lateral member and a second lateral member, said first lateral member and said second lateral member being superposed said upper surface of said base member, said first lateral member and said second lateral member having a space therebetween, said lateral support assembly configured to support the pump and assist in inhibiting movement thereof.

3. The pump support device configured to have a pump releasably secured thereto in order to perform maintenance on the pump as recited in claim 2, further including an oil drain member, said oil drain member being secured to said upper surface of said base member, said oil drain member having a first end and a second end, said oil drain member being perpendicular to said second lateral edge of said base member and extending outward therefrom, said oil drain member configured to transfer oil draining from said pump to said second end thereof.

4. The pump support device configured to have a pump releasably secured thereto in order to perform maintenance on the pump as recited in claim 3, wherein said oil drain member further includes a keeper, said keeper being secure to said second end of said oil drain member and said keeper configured to assist in securing a container to said second end of said oil drain member.

5. The pump support device configured to have a pump releasably secured thereto in order to perform maintenance on the pump as recited in claim 4, further including a second vertical support member, said second vertical support member being secured to said upper surface of said base member being perpendicular therewith and said second vertical support being aligned with said space of said lateral support assembly.

6. The pump support device configured to have a pump releasably secured thereto in order to perform maintenance on the pump as recited in claim 5, wherein at least one of said plurality of support members of said first vertical support member assembly has a width that is less than that of additional support members.

7. The pump support device configured to have a pump releasably secured thereto in order to perform maintenance on the pump as recited in claim 6, wherein said rotational support member further includes a pin member, said pin member configured to lock said base member in degree increments during rotation of said rotational support member through three-hundred and sixty degrees.

8. The pump support device configured to have a pump releasably secured thereto in order to perform maintenance on the pump as recited in claim 7, wherein said first vertical support member assembly is configured to be adjustable to alternate heights in order to engage different models of pumps.

* * * * *